United States Patent
Kapaan et al.

(10) Patent No.: US 7,021,416 B2
(45) Date of Patent: Apr. 4, 2006

(54) VEHICLE CONTROL WITH MANUAL BACK UP

(75) Inventors: Hendrikus Jan Kapaan, Nieuwegein (NL); Eduardus Gerardus Maria Holweg, Delft (NL); Aurelio Nervo, Turin (IT)

(73) Assignee: SKF Engineering and Research Centre B.V., Nieuwegein (NL)

( * ) Notice: Subject to any disclaimer, the term of this patent is extended or adjusted under 35 U.S.C. 154(b) by 10 days.

(21) Appl. No.: 10/240,116

(22) PCT Filed: Apr. 11, 2001

(86) PCT No.: PCT/NL01/00290

§ 371 (c)(1),
(2), (4) Date: Nov. 6, 2002

(87) PCT Pub. No.: WO01/76932

PCT Pub. Date: Oct. 18, 2001

(65) Prior Publication Data

US 2003/0173136 A1      Sep. 18, 2003

(30) Foreign Application Priority Data

Apr. 11, 2000  (NL) .................................... 1014912

(51) Int. Cl.
*B62D 5/00* (2006.01)
(52) U.S. Cl. ........................ 180/405; 74/484 R; 74/491
(58) Field of Classification Search ................ 180/333, 180/402, 405; 74/471 XY, 480 R, 484 R, 74/486, 487, 471 R, 490.11, 490.12, 490.14, 74/491; B62D 1/22

See application file for complete search history.

(56) References Cited

U.S. PATENT DOCUMENTS

| 3,256,951 | A | * | 6/1966 | Hart ............................ 180/405 |
| 3,275,093 | A | * | 9/1966 | Pawl ........................... 180/332 |
| 5,002,032 | A |   | 3/1991 | Kolberg ....................... 123/399 |
| 5,086,870 | A |   | 2/1992 | Bolduc ........................ 180/333 |
| 5,131,483 | A | * | 7/1992 | Parkes ........................ 180/6.48 |
| 5,275,250 | A |   | 1/1994 | Muller et al. ................ 180/402 |
| 5,553,684 | A | * | 9/1996 | Bolduc ........................ 180/333 |
| 5,680,797 | A | * | 10/1997 | Elsasser ....................... 74/528 |
| H001831   | H | * | 2/2000 | Kelley et al. ................ 180/333 |
| 6,209,677 | B1| * | 4/2001 | Bohner et al. .............. 180/406 |
| 6,263,753 | B1| * | 7/2001 | Froehlich ..................... 74/482 |
| 6,896,090 | B1| * | 5/2005 | Kanda et al. ................ 180/402 |

FOREIGN PATENT DOCUMENTS

| GB | 2 165 664 A |   | 4/1986 |
| JP | 08282505 A | * | 10/1996 |
| JP | 10086683 A | * | 4/1998 |
| JP | 10230843 A | * | 9/1998 |

* cited by examiner

*Primary Examiner*—Paul N. Dickson
*Assistant Examiner*—Laura B. Rosenberg
(74) *Attorney, Agent, or Firm*—Oliff & Berridge, PLC

(57) ABSTRACT

A manual control device for electrically driven and controlled steering, and/or accelerating and/or decelerating of a road vehicle, that includes a hand grip device, sensors for sensing a force and/or a movement imposed on the hand grip device which correspond to a desired steering direction, and/or acceleration and/or deceleration of the vehicle, as well as a manual lever device comprising at least one mechanical connection for mechanically steering, and/or accelerating, and/or decelerating (e.g. maintenance parking etc.) of the vehicle in the absence of electric power (e.g. in the case of an electric power failure or in the case of electric power switched off) maintenance, garage parking etc., the manual lever device being swivelable or rotatable about at least one axis for actuating said at least one mechanical connection.

14 Claims, 3 Drawing Sheets

VEHICLE CONTROL WITH MANUAL BACK UP

BACKGROUND

The invention is related to the field of manual control means for electrically driven steering and/or decelerating and/or accelerating of a road vehicle. Such control of vehicles is becoming more important as a result of recent developments related to electromechanical actuators, e.g. screw actuators for driving the vehicle brakes, steering column, clutch etc.

The purely mechanical control of standard brakes etc. relies on mechanical or hydraulic links, such as the hydraulic piping in the case of brakes, and the rotating steering column. The flexible cable or lever drive connected to the accelerator pedal, are also well known.

It is envisaged, however, that the full benefits of electrically steering devices etc. will be obtained with regard to manual control means that are adapted to the electric character thereof. This would enable to select a more flexible design of, e.g., the routing of the command links through the vehicle, and would also save costs. On the other hand, the overall safety level of the vehicle should not be impaired, in particular, a possible electric power interruption.

SUMMARY

The object of the invention is, therefore, to provide a manual control means which is specifically adapted to the electric character of recent steering, braking, and accelerating devices etc., and which also can ensure the required safety level.

This object is achieved by the invention in that a manual control means is provided for the electrically driven and controlled steering, and/or accelerating and/or decelerating of a road vehicle, comprising: a hand grip means; sensors for sensing a force and/or a movement imposed on the hand grip means which correspond to a desired steering direction, and/or acceleration and/or deceleration of the vehicle; and manual lever means comprising at least one mechanical connection for mechanically steering, and/or accelerating, and/or decelerating of the vehicle in the absence of electric power, such as in the case of an electric power failure or in the case of electric power switched off, maintenance, garage parking etc., where the manual lever means being rotatable about at least one axis for actuating said at least one mechanical connection.

The manual control means according to the invention comprises first of all a hand grip means which is influenced by the human hand so as to provide the desired steering, and/or decelerating and/or accelerating signals. These signals can be conveyed to the respective electromechanical actuator devices through electric cables, which enables a flexible routing. Additionally, the manual control means comprise a mechanical back-up device for each function, which makes it possible to achieve a safe conduct of the vehicle in the case of a power interruption. For example, the manual control means can achieve a safe conduct of the vehicle in an emergency situation, but the mechanical back-up system can also be used in other circumstances, e.g. during maintenance, garage parking, etc.

During mechanical control of the vehicle, the control forces to be exerted on the hand grip means should remain limited for the driver so as to maintain control over the vehicle. Preferably the hand grip means is at one end of the manual lever means, the other end of said manual lever means being swivelable about at least one axis and comprising a mechanical connection which provides a displacement and/or a rotation upon swiveling the manual lever means about said axis.

In particular, the manual lever means is swivelable about two non parallel axes and comprises two mechanical connections which each provide a displacement and/or a rotation upon swiveling the manual lever means about the corresponding axis. This manually operated lever provides, e.g., a rotating torque which is high enough for steering the vehicle, while at the same time operating forces to be exerted by the driver can remain limited.

According to a preferred embodiment, a support means is provided which carries a first swivel having a first swivel axis, a second swivel being provided on the first swivel and having a second swivel axis transverse with respect to the first swivel axis, the manual lever means being connected to the second swivel, and an immobilization means which immobilizes the manual lever means with respect to the support means in the case of nominal operation and availability of electric power, and which allows swiveling motion in the case of power failure.

During normal operation, the control of the vehicle takes place entirely through the electric sensors of the hand grip means, e.g. a joystick which provide the signals required for steering, decelerating and/or accelerating. The joystick can be with or without integrated buttons. In the case of electric power failure, the handgrip means can make additional swiveling motions so as to perform these functions in a purely mechanical way.

The immobilization means may also comprise an electromagnetic coupling.

Although reference has been made before to the control of electromechanical actuators, electro-hydraulic actuators can also be controlled by the manual control means according to the invention.

BRIEF DESCRIPTION OF THE DRAWINGS

The invention will now be described further with reference to an electromechanical steering device according to the invention, as shown in the drawings.

DETAILED DESCRIPTION OF THE EMBODIMENTS

Figure 1:
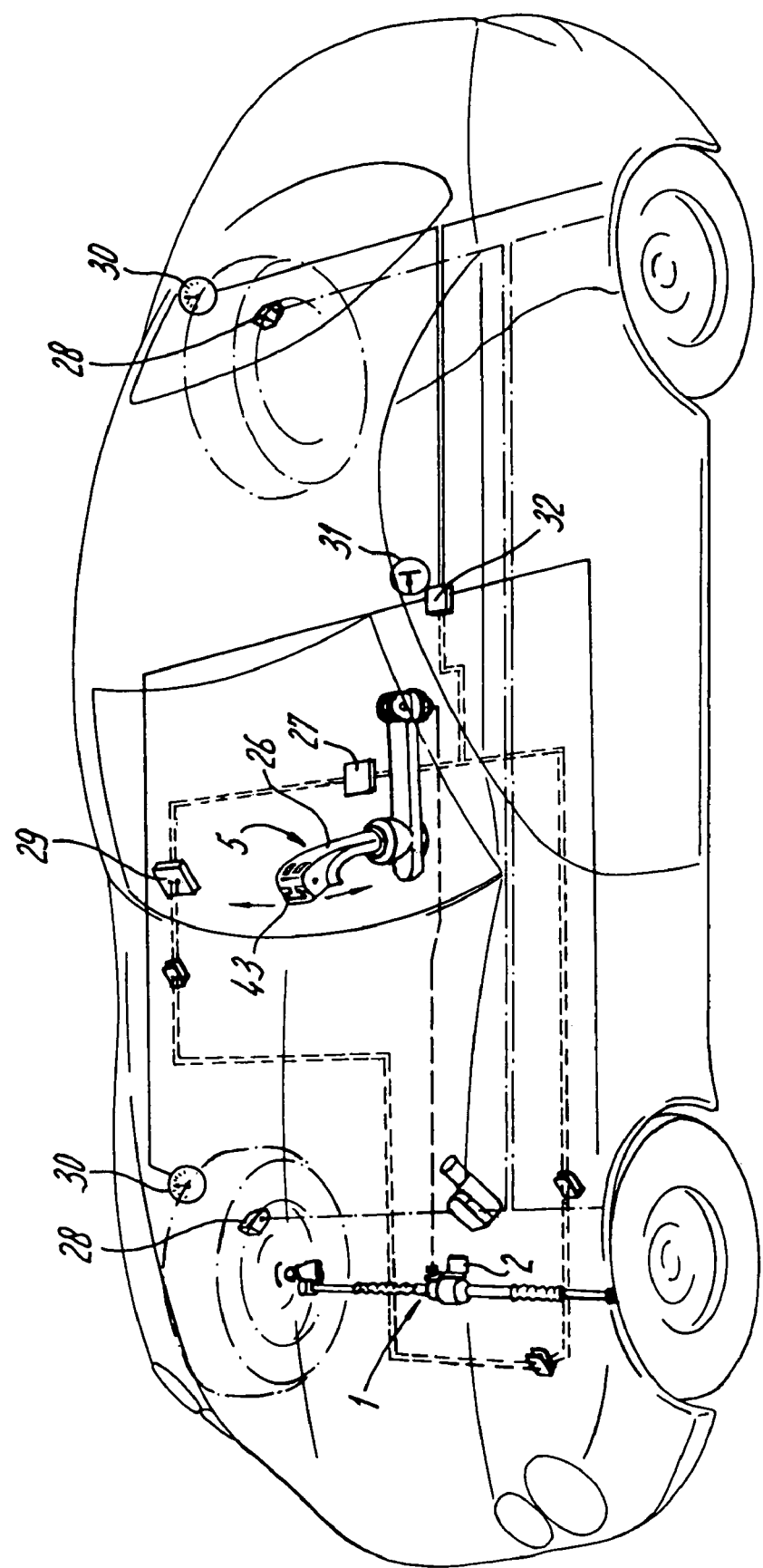
FIG. 1 shows the general layout of a vehicle provided with a manual control means for an electric steering and brake device according to the invention.

The vehicle shown in FIG. 1 comprises a screw actuator 1 which is connected to the front wheels of the vehicle, as well as a joystick 26 situated near the driver's seat. The joystick 26 may have integrated pressure buttons 43. Furthermore, electromechanical brake actuators 28 are provided which control the disk brakes on all wheels of the vehicle, and which also may be controlled by the joystick 26. Electromechanical drum brakes may also form a part of a complete electromechanical brake system.

The joystick 26 is connected to an electronic control unit 27, which through the driving dynamic controller 29 controls the electric motor 2 of the screw actuator 1.

The joystick 26 also controls the electromechanical brake actuators 28 on the basis of signals received from the wheel speed sensors 30. Furthermore, sensors 31 have been incorporated which monitor the driving status, all sensors being connected to the sensor electronics control device 32.

Figure 2:
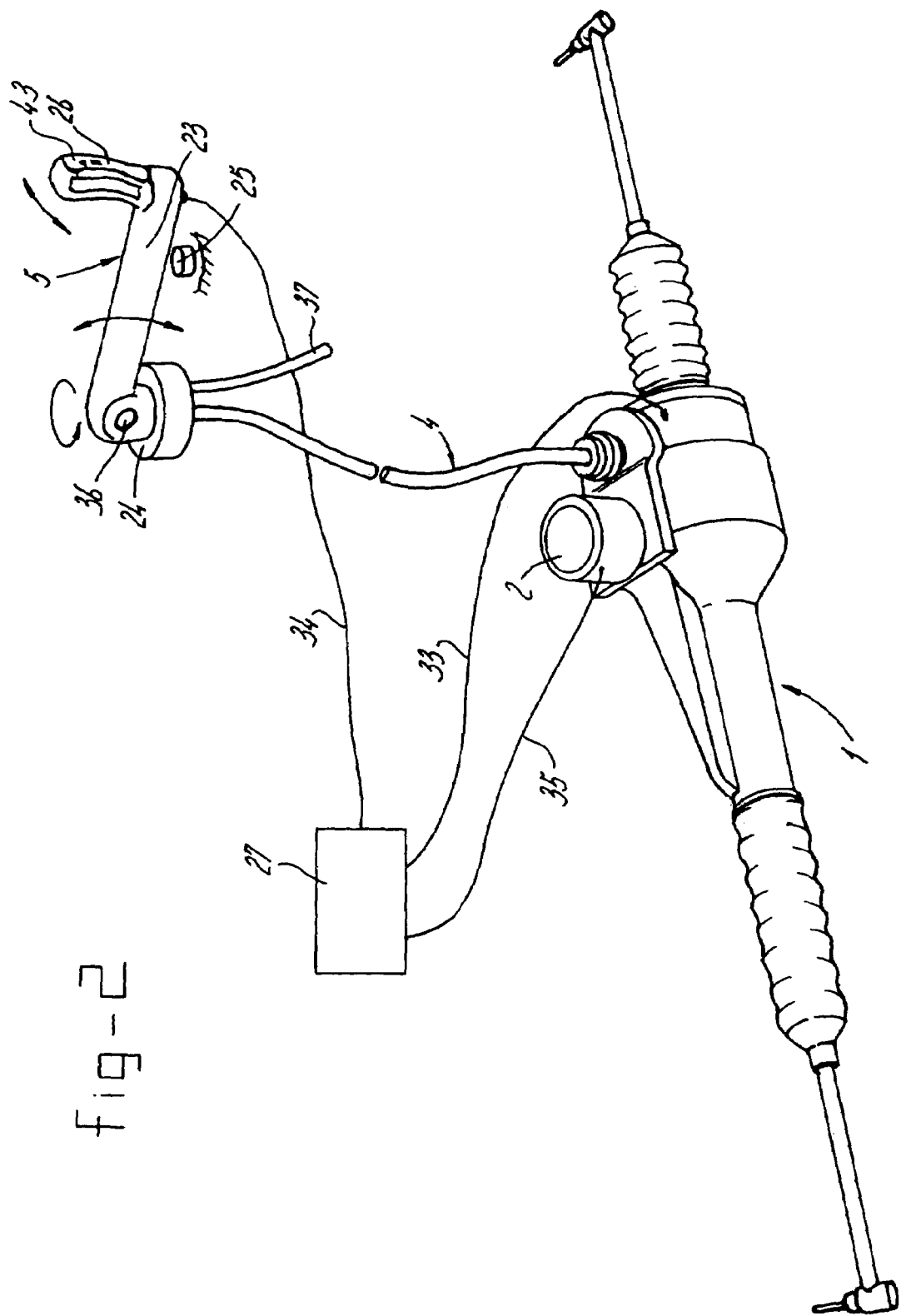
FIG. 2 shows the general layout of the electric steering device according to the invention.

As shown in FIG. 2, the control unit 27 receives signals related, e.g., to the load exerted on the screw actuator 1, displacements and/or rotations of components thereof, through cable 33. Through cable 34, the control unit 27 receives signals from the joystick 26. On the basis of these signals, the electric motor 2 is controlled, through cable 35, for actuating the screw actuator 1.

The joystick 26 is mounted at the free end of the lever 23, which is rotatable around a vertical axis on the swivel point 24. Furthermore, the lever 23 can pivot about the horizontal pivot axis of the hinge 36.

By means of the immobilization means 25, e.g. an electromagnetic coupling, the lever 23, and thereby the joystick 26 are held in a nominal position under nominal conditions, that is when electric current is available.

In the absence of electric current, e.g. when the electric current is switched off or in case of an electric power failure, the electromagnetic coupling 25 is released and by manipulating the lever 23 through the joystick 26, a rotation through swivel 24 is imparted on the flexible cable 4 which is capable to transmit a torque.

In turn, this flexible cable 4 drives the screw actuator 1 in such a way that steering action is still possible.

Additionally, a flexible brake cable 37 is provided, which, in the absence of an electric power, is controlled by pivoting the lever 23 about the hinge 36. The flexible cable 37 is connected to the brake actuators 28, but is not shown in further detail.

The actuator applied can be executed with a rotating nut and a moving screw, or a moving nut and a rotating screw.

Figure 3:
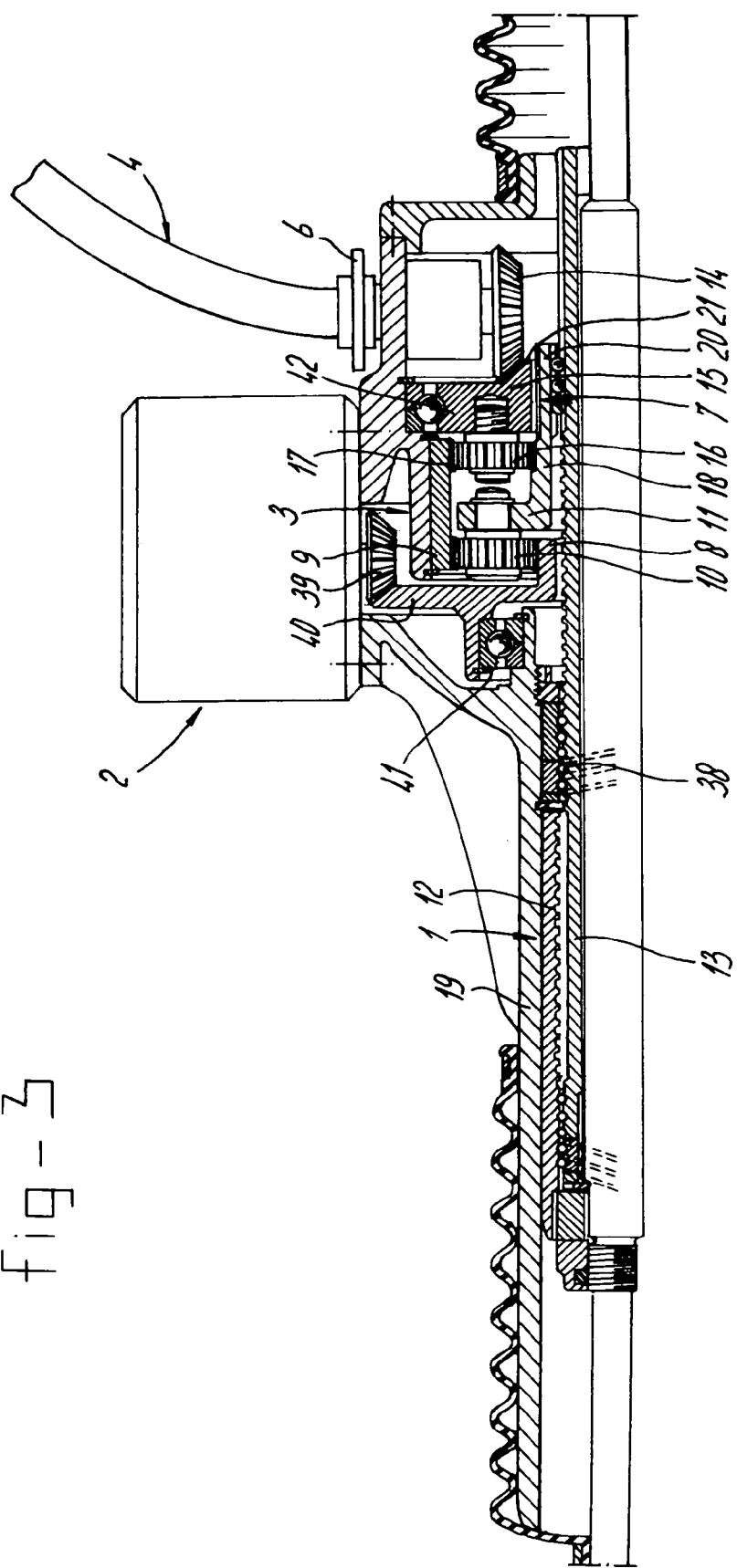
FIG. 3 shows a cross-section of the screw actuator.

As shown in FIG. 3, the screw actuator 1 is accommodated in a housing 19, which is non-rotatably fixed with respect to e.g., the chassis of a vehicle. The nut 12 is immovably fixed within the housing 12. The screw 13 is rotatably and translatably supported within the nut 12 by means of the balls 38, which engage correspondingly shaped screw threads in the nut 12 and the screw 13.

The screw actuator 1 is actuated through an electric motor 2 which two bevel pinion 39 drives a first reduction bevel gear 40 which is positioned around the screw 13. The bevel gear 40 is rotatably supported by means of bearing 41. The bevel gear 40 is integrated with a sun gear wheel 8, which engages satellite gear wheels 10. The housing 1 carries a fixed ring gear wheel 9, which also engages the satellite gear wheels 10.

The satellite gear wheels 10 are rotatably mounted on a carrier 11, which through the spline/ball mechanism 20 is able to rotate the screw 13.

The bevel gears 39, 40, as well as the satellite gear wheel mechanism 8–11 provide the necessary reduction of the motor rotations for driving the screw actuator 1.

In case of an electric power interruption, the electric motor 2 is no longer able to drive the screw actuator 1. For this reason, a mechanical back-up system is provided, comprising a flexible cable 4, which is connected to electromagnetic coupling 6. In case of a power interruption, the electromagnetic coupling 6 connects the flexible cable 4 to the auxiliary drive (bevel) gear wheel 14. The auxiliary drive gear wheel 14 engages a bevel gear 21, which surrounds the screw 13. The bevel gear 21 is integrated with an auxiliary carrier 15, rotatably supported with respect to the housing by means of the bearing 42.

The carrier 15 carries auxiliary satellite gear wheels 16, which engage a fixed auxiliary ring gear wheel 17, as well as an auxiliary sun gear wheel 18 integrated with the carrier 11.

By rotating the flexible cable through the lever 23 (see FIG. 2) the screw 13 can thus be rotated mechanically.

The bevel gears 14, 21 or other appropriate gear transmission principles are accelerating preferably for accelerating gear wheels.

The invention claimed is:

1. Manual control means for at least one of electrically driven and controlled steering, accelerating, and decelerating of a road vehicle, comprising:
   a hand grip means;
   sensors for sensing at least one of a force and a movement imposed on the hand grip means which correspond to at least one of a desired steering direction, acceleration, and deceleration of the vehicle;
   a support means which is fixed with respect to the vehicle;
   manual lever means including:
   at least one mechanical connection for at least one of mechanically steering, accelerating, and decelerating of the vehicle in the absence of electric power, wherein the manual lever means is swivelable or rotatable about at least one axis with respect to the support means, characterized by an immobilization means which immobilizes the manual lever means with respect to the support means in case of nominal operation and availability of electric power, and which allows swiveling motion in case of power failure.

2. Control means according to claim 1, wherein the immobilization means includes an electromagnetic coupling.

3. Control means according to claim 2, wherein the lever means engages a gear reduction.

4. Control means according to claim 2, wherein the handgrip means is a joystick with integrated pressure buttons.

5. Control means according to claim 2, wherein support means is provided which carries a first gear wheel having a first gear wheel axis, a second gear wheel being provided on the first gear wheel having a second gear wheel axis transverse with respect to the first gear wheel axis, the manual lever means being connected to the second gear wheel.

6. Control means according to claim 2, wherein the handgrip means is a joystick without integrated pressure buttons.

7. Control means according to claim 1, wherein the lever means engages a gear reduction.

8. Control means according to claim 7, wherein the handgrip means is a joystick with integrated pressure buttons.

9. Control means according to claim 7, wherein the support means is provided which carries a first gear wheel having a first gear wheel axis, a second gear wheel being provided on the first gear wheel having a second gear wheel axis transverse with respect to the first gear wheel axis, the manual lever means being connected to the second gear wheel.

10. Control means according to claim 7, wherein the handgrip means is a joystick without integrated pressure buttons.

11. Control means according to claim 1, wherein the handgrip means is a joystick with integrated pressure buttons.

12. Control means according to claim 11, wherein the support means is provided which carries a first gear wheel having a first gear wheel axis, a second gear wheel being provided on the first gear wheel having a second gear wheel axis transverse with respect to the first gear wheel axis the manual lever means being connected to the second gear wheel.

13. Control means according to claim 1, wherein athe support means is provided which carries a first gear wheel having a first gear wheel axis, a second gear wheel being provided on the first gear wheel having a second gear wheel axis transverse with respect to the first gear wheel axis, the manual lever means being connected to the second gear wheel.

14. Control means according to claim 1, wherein the handgrip means is a joystick without integrated pressure buttons.

\* \* \* \* \*